(12) United States Patent
Ahmed et al.

(10) Patent No.: US 11,358,128 B2
(45) Date of Patent: Jun. 14, 2022

(54) HIGH ACTIVITY REFORMING CATALYST FORMULATION AND PROCESS FOR LOW TEMPERATURE STEAM REFORMING OF HYDROCARBONS TO PRODUCE HYDROGEN

(71) Applicants: Saudi Arabian Oil Company, Dhahran (SA); King Fahd University of Petroleum & Minerals, Dhahran (SA)

(72) Inventors: Shakeel Ahmed, Dhahran (SA); Aadesh Harale, Dhahran (SA); Mohammed Albuali, Dhahran (SA); Kunho Lee, Dhahran (SA); Sai P. Katikaneni, Dhahran (SA); Mohammed Draze, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 278 days.

(21) Appl. No.: 16/730,257

(22) Filed: Dec. 30, 2019

(65) Prior Publication Data

US 2021/0197178 A1 Jul. 1, 2021

(51) Int. Cl.
*B01J 23/83* (2006.01)
*B01J 21/04* (2006.01)
(Continued)

(52) U.S. Cl.
CPC ............... *B01J 23/83* (2013.01); *B01J 21/04* (2013.01); *B01J 37/009* (2013.01); *B01J 37/024* (2013.01);
(Continued)

(58) Field of Classification Search
CPC . B01J 23/83; B01J 21/04; B01J 37/009; B01J 37/0205; B01J 37/0236;
(Continued)

(56) References Cited

U.S. PATENT DOCUMENTS 4,738,946 A * 4/1988 Yamashita ................ C07C 4/06
502/303
5,229,102 A * 7/1993 Minet ...................... C01B 3/384
423/652
(Continued)

FOREIGN PATENT DOCUMENTS

CN 102247858 A 11/2011
CN 103752319 A 4/2014
(Continued)

OTHER PUBLICATIONS

Liu et al. "Hydrogen production for fuel cells through methane reforming at low temperatures", Journal of Power Sources 111(2002) p. 283-287 (Year: 2002).*
(Continued)

*Primary Examiner* — Anthony J Zimmer
*Assistant Examiner* — Syed T Iqbal
(74) *Attorney, Agent, or Firm* — Bracewell LLP; Constance G. Rhebergen; Eleanor L. Tyson

(57) ABSTRACT

A method for producing a hydrogen rich gas from a heavy hydrocarbon feed comprising the steps of introducing the hydrocarbon feed to a reactor, the reactor comprising a low temperature reforming catalyst, the low temperature reforming catalyst comprising an amount of praseodymium, 12 wt % nickel, and an aluminum oxide component, contacting the low temperature reforming catalyst with the hydrocarbon feed in the reactor, wherein the reactor operates at a temperature between 500° C. and 600° C., wherein the reactor operates at a pressure between 3 bar and 40 bar, and producing the hydrogen rich gas over the low temperature reforming catalyst, wherein the hydrogen rich gas comprises hydrogen.

11 Claims, 10 Drawing Sheets

(51) Int. Cl.
*B01J 37/00* (2006.01)
*B01J 37/02* (2006.01)
*B01J 37/08* (2006.01)
*C01B 3/40* (2006.01)

(52) U.S. Cl.
CPC ....... *B01J 37/0205* (2013.01); *B01J 37/0236* (2013.01); *B01J 37/088* (2013.01); *C01B 3/40* (2013.01); *C01B 2203/0233* (2013.01); *C01B 2203/1058* (2013.01); *C01B 2203/1082* (2013.01); *C01B 2203/1241* (2013.01)

(58) Field of Classification Search
CPC ...... B01J 37/024; B01J 37/088; B01J 23/755; B01J 35/002; B01J 35/1014; C01B 3/40; C01B 2203/0233; C01B 2203/1058; C01B 2203/1082; C01B 2203/1241; C01B 2203/0238; C01B 2203/1041; C01B 3/384; Y02P 20/141; Y02P 20/52
See application file for complete search history.

(56) References Cited

U.S. PATENT DOCUMENTS

| | | | |
|---|---|---|---|
| 7,163,963 B2 | 1/2007 | Fraenkel | |
| 7,378,370 B2 | 5/2008 | Cai et al. | |
| 7,402,612 B2 | 7/2008 | Jin et al. | |
| 7,700,005 B2 | 4/2010 | Tomoyuki et al. | |
| 7,790,776 B2 | 9/2010 | Christensen et al. | |
| 7,820,140 B2 | 10/2010 | Inui et al. | |
| 7,824,656 B2 | 11/2010 | Idem et al. | |
| 8,008,226 B2 | 8/2011 | Inui et al. | |
| 8,575,063 B2 | 11/2013 | Xu et al. | |
| 9,403,157 B2 | 8/2016 | Jen et al. | |
| 9,499,403 B2 | 11/2016 | Al-Muhaish et al. | |
| 9,714,169 B2 | 7/2017 | Al-Muhaish et al. | |
| 9,757,714 B2 | 9/2017 | Teunissen et al. | |
| 2004/0132834 A1* | 7/2004 | Ortego | B01J 37/0207 518/718 |
| 2012/0201733 A1 | 8/2012 | Takahashi et al. | |
| 2018/0036714 A1 | 2/2018 | Matsuo et al. | |

FOREIGN PATENT DOCUMENTS

| | | |
|---|---|---|
| EP | 1315671 A2 | 6/2003 |
| WO | 2000169000 A1 | 3/2000 |
| WO | 2003051493 A2 | 6/2003 |
| WO | 2019077288 A1 | 4/2019 |

OTHER PUBLICATIONS

PCT ISRWO mailed on Mar. 25, 2021, in the prosecution of International Application No. PCT/US2020/067050, 12 pages.

King Wang et al., Effect of Pr addition on the properties of Ni/Al2O3 catalysts with an application in the autothermal reforming of methane, 39 Int'l J. Hydrogen Energy, 778-787 (2014).

Jichang Lu et al., Weakening the metal-support strong interaction to enhance catalytic performances of alumina supported Ni-based catalysts for producing hydrogen, Applied Catalysts B-Environmental (2019).

* cited by examiner

HIGH ACTIVITY REFORMING CATALYST FORMULATION AND PROCESS FOR LOW TEMPERATURE STEAM REFORMING OF HYDROCARBONS TO PRODUCE HYDROGEN

TECHNICAL FIELD

Disclosed are compositions and methods related to catalyst formulations. Specifically, disclosed are compositions and methods for catalyst formulations to convert hydrocarbons to hydrogen rich gas.

BACKGROUND

Energy is a growing global business, with rapid increases expected in transportation fuel consumption and in electricity production. Recent improvements to existing technology have added significant value to marginal resources of competing fuels or through more efficient conversion of oil-based fuel sources (for example, hybrids and diesel engines). Renewed interest in non-oil based hydrogen technologies represents a challenge to oil producers. But also, an opportunity for developing competitive petroleum-based conversion approaches and petroleum-based fuels to take advantage of a possible emerging change in customer and consumer preferences for energy products.

A well-established process in the petroleum industry for the production of hydrogen is the steam reforming process. The steam reforming process uses a nickel-based catalyst, which is highly sensitive to deactivation by sulfur poisoning and coke deposition. However, conventional processes require high amounts of nickel in the catalyst and temperatures greater than 800° C. in the reactors. Such high temperatures require more robust equipment and greater expenditures of energy.

SUMMARY

Disclosed are compositions and methods related to catalyst formulations. Specifically, disclosed are compositions and methods for catalyst formulations to convert hydrocarbons to hydrogen rich gas.

In a first aspect, a method for producing a hydrogen rich gas from a hydrocarbon feed is provided. The method includes the steps of introducing the hydrocarbon feed to a reactor, the reactor includes a low temperature reforming catalyst. The low temperature reforming catalyst includes an amount of praseodymium, 12 wt % nickel, and an aluminum oxide component. The method further includes the steps of introducing a steam feed to the reactor, where the steam feed includes steam, where a ratio of steam to carbon is in the range between 2.8 and 4.2, contacting the low temperature reforming catalyst with the hydrocarbon feed in the reactor, where the reactor operates at a temperature between 500° C. and 600° C., where the reactor operates at a pressure between 3 bar and 40 bar, and producing the hydrogen rich gas over the low temperature reforming catalyst, where the hydrogen rich gas includes hydrogen.

In certain aspects, the amount of praseodymium is present in an amount between 1 wt % and 9 wt %. In certain aspects, the amount of praseodymium is 3 wt %. In certain aspects, the hydrocarbon feed includes methane. In certain aspects, the hydrogen rich gas includes an additional gas selected from the group consisting of carbon dioxide, carbon monoxide, methane, nitrogen, and combinations of the same. In certain aspects, the method further includes reducing the low temperature reforming catalyst before contacting the low temperature reforming catalyst with the hydrocarbon feed, includes the steps of introducing a reducing gas to the reactor for at least 8 hours, where the reducing gas includes hydrogen and nitrogen. In certain aspects, the method further includes preparing the low temperature reforming catalyst. Preparing the low temperature reforming catalyst includes the steps of impregnating a dried alumina powder with a praseodymium nitrate solution to produce a precursor containing the amount of praseodymium, drying the precursor at 250° C. for 8 hours to produce a dried precursor, increasing a temperature of the dried precursor to 450° C. at a rate of 5° C./min, calcining the dried precursor in air at 450° C. for at least 4 hours to produce a calcined precursor, reducing a temperature of the calcined precursor, impregnating the calcined precursor with $Ni(NO_3)_3 \cdot 6H_2O$ solution to produce a nickel impregnated precursor, drying the nickel impregnated precursor at a temperature of 60° C. for at least 1 hour, subjecting the nickel impregnated precursor to ammonia vapors for 10 minutes, increasing a temperature of the nickel impregnated precursor to 250° C. at a rate of 2° C./min, drying the nickel impregnated precursor at 250° C. for at least 1 hour to produce a dried catalyst, calcining the dried catalyst in air at 450° C. for about 2 hours to produce a calcined catalyst, and reducing a temperature of the calcined catalyst to room temperature in a desiccator to produce the low temperature reforming catalyst, where the desiccator is configured to desiccate the calcined catalyst to produce particles of the low temperature reforming catalyst. In certain aspects, the method of preparing the low temperature reforming catalyst further includes the step of sieving the particles of the low temperature reforming catalyst to obtain particles in the range between 0.1 mm and 1 mm. In certain aspects, a conversion of hydrocarbons to hydrogen is greater than 50%. In certain aspects, the amount of hydrogen is in the range between 45 mol % and 70 mol %. In certain aspects, the method further includes using the hydrogen rich gas as a fuel for a vehicle. In certain aspects, the reactor is an impregnated membrane reactor, where the impregnated membrane reactor includes a hydrogen selective membrane impregnated with the low temperature reforming catalyst.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1:
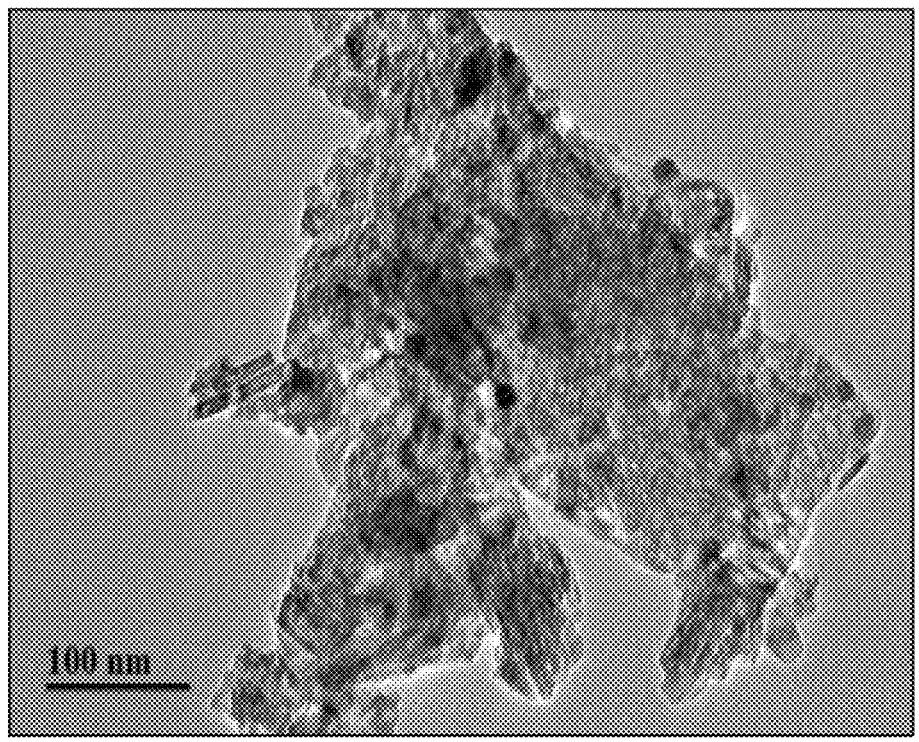
FIG. 1 provides a TEM image of the base nickel catalyst.

While the scope will be described with several embodiments, it is understood that one of ordinary skill in the relevant art will appreciate that many examples, variations and alterations to the apparatus and methods described here are within the scope. Accordingly, the embodiments described are set forth without any loss of generality, and without imposing limitations, on the embodiments. Those of skill in the art understand that the scope includes all possible combinations and uses of particular features described in the specification.

Described here are compositions and methods of low temperature reforming catalysts for use in converting hydrocarbons to hydrogen rich gas. The low temperature reforming catalysts can be used in steam reforming Advantageously, the low temperature reforming catalysts are stable and have increased activity compared to other nickel catalysts. Advantageously, the low temperature reforming catalysts can be combined with a hydrogen selective membrane for increased efficiency. Advantageously, the low temperature reforming catalyst can promote a high concentration of hydrogen in the reaction product. Advantageously, the low temperature reforming catalysts can reduce carbon dioxide emissions.

As used throughout, "in the absence" means the composition or method does not include, does not contain, is without.

The low temperature reforming catalyst can include a praseodymium component, a nickel component, and an aluminum oxide component.

The praseodymium component can include praseodymium oxide. The praseodymium oxide can be present as $Pr_2O_3$, $PrO_2$, and combinations of the same. In at least one embodiment, a reduction step of the catalyst can convert the $Pr_2O_3$ to $PrO_2$. The amount of praseodymium present can be between 1 percent by weight (wt %) and 9 wt %. In at least one embodiment, the low temperature reforming catalyst includes 3 wt % praseodymium. The amount of praseodymium is measured as the amount of praseodymium metal regardless of form.

The nickel component can include nickel metal and nickel oxide. The amount of nickel present can be between 10 wt % and 45 wt %. In at least one embodiment, the low temperature reforming catalyst includes 12 wt % nickel. The amount of nickel is measured as the amount of nickel metal regardless of form.

The aluminum oxide component can have the formula $Al_2O_3$. The aluminum oxide component can be present in an amount between 50 wt % and 85 wt %. The aluminum oxide component functions as the catalyst support. Aluminum oxide component can be in the form of powder, granules, extrudates, or coating on a structure. The structure to which an aluminum oxide layer can be coated includes mesh, microlith, or any other structure capable of taking an aluminum oxide coating.

In at least one embodiment, the low temperature reforming catalyst includes praseodymium present at about 3 wt %, nickel present at about 12 wt %, aluminum oxide present at about 50 wt % and 85 wt %, and the remainder oxygen. The amount of oxygen is anticipated to be between 30 wt % and 50 wt %. In at least one embodiment, the overall amount of oxygen in the low temperature reforming catalyst is about 40 wt %.

The low temperature reforming catalyst can be resistant to coke formation on the catalyst. The low temperature reforming catalyst can have a surface area in the range between 60 $m^2/g$ and 70 $m^2/g$, alternately between 60 $m^2/g$ and 69 $m^2/g$, and alternately between 60 $m^2/g$ and 66 $m^2/g$.

A method of preparing the low temperature reforming catalyst for converting hydrocarbons to hydrogen rich gas using a successive impregnation method is described. In an optional first step of the method, an amount of alumina powder can be dried at 250° C. for between 1 hour and 2 hours to produce a dried alumina powder. The dried alumina powder is then impregnated with a praseodymium nitrate solution to produce a precursor. The amount of praseodymium nitrate in the praseodymium nitrate solution can be selected to achieve a desired amount of praseodymium in the low temperature reforming catalyst.

The precursor can then be dried at 250° C. for about 8 hours to produce a dried precursor. The temperature of the dried precursor can be increased to 450° C. at a rate of 5° C. per minute (° C./min) in air and maintained at 450° C. for at least 4 hours and alternately between 4 hours and 6 hours to calcine the dried precursor to produce a calcined precursor. The calcining step can remove organic agents used in the synthesis of the dried precursor.

The calcined precursor is impregnated with nickel (II) hexahydrate ($(Ni(NO_3)_2 \cdot 6H_2O)$) to achieve the desired amount of nickel to produce the nickel impregnated precursor. The nickel impregnated precursor can be dried at 60° C. for at least 1 hour and alternately between 1 hour and 4 hours and then subjected to ammonia vapors for 10 minutes at 60° C. Following the ammonia treatment, the temperature can be increased to 250° C. at a heating rate of 2° C./min and drying can continue for at least 1 hour and alternately between 1 hour and 4 hours to produce a dried catalyst. The dried catalyst can be calcined in air at about 450° C. for about 2 hours to produce a calcined catalyst. The calcined catalyst can then be cooled to room temperature in a desiccator to produce the low temperature reforming catalyst. The particles of the low temperature reforming catalyst can be sieved to select the desired particle size. The particle size can be in the range between 0.1 mm and 1 mm, alternately between 0.2 mm and 05 mm.

The low temperature reforming catalyst can be used to produce a hydrogen rich gas from hydrocarbons. The low temperature reforming catalyst can be loaded into a reactor. The reactor can be any type of reactor suitable for holding a catalyst. Examples of suitable reactors can include fixed bed reactors, packed bed reactors, fluidized bed reactors, impregnated membranes, and combinations of the same. In at least one embodiment the reactor is an impregnated membrane reactor. The impregnated membrane can include a hydrogen selective membrane. Advantageously, the use of an impregnated membrane reactor results provides the ability to separate hydrogen from the reaction products which can drive the reaction equilibrium to favor production of hydrogen. In at least one embodiment, the low temperature reforming catalyst can be reduced after being loaded into the reactor. The reduction step can be performed using a reducing gas at a temperature between 450° C. and 600° C. for at least 8 hours. In at least one embodiment, the temperature during the reduction step is between 550° C. and 600° C. The reducing gas can include hydrogen, nitrogen, and combinations of the same. In at least one embodiment the reducing gas includes 25% hydrogen in nitrogen. The reduction step can reduce at least some of the nickel oxide in the low temperature reforming catalyst to a nickel metal form.

A hydrocarbon feed can be introduced to the reactor. The hydrocarbon feed can contain hydrocarbons and other gases. The source of the hydrocarbon feed can be a pre-forming process. The hydrocarbon feed can contain methane, C2 to C6 hydrocarbons, carbon monoxide, carbon dioxide, nitrogen, hydrogen and combinations of the same. The C2 to C6 hydrocarbons can include saturated C2 to C6 hydrocarbons, unsaturated C2 to C6 hydrocarbons, and combinations of the same. In at least one embodiment, the hydrocarbon feed contains only methane. The hydrocarbon feed is in the absence of oxygen. The hydrocarbon feed is in the absence of methanol.

A steam feed is introduced to the reactor. The steam feed can include steam. The gas hourly space velocity of the hydrocarbon feed and the steam feed are maintained to provide a ratio of steam to carbon in the range between 2.8 and 4.2. The carbon referring to the amount of elemental carbon in the hydrocarbon feed.

The hydrocarbon feed contacts the low temperature reforming catalyst in the reactor. The reactor can be operated at a temperature in the range between 450° C. and 650° C., alternately between 500° C. and 600° C. The reactor can be operated at pressure in the range between atmospheric pressure and 40 bar, alternately between 3 bar and 20 bar, alternately between 5 bar and 40 bar, alternately between 3 bar and 40 bar, alternately between 5 bar and 10 bar, and alternately between 3 bar and 7 bar. The pressure selected can depend on the type of reactor selected. In packed bed reactor configurations, at pressures greater than about 20 bar the methanation reaction to convert hydrogen and carbon dioxide to methane is favored, thus maintaining a pressure below about 20 bar is required to favor production of hydrogen at the thermodynamic equilibrium in a packed bed reactor configuration. In impregnated membrane reactors with hydrogen selective membranes, where the hydrogen is removed as it is produced, pressures greater than 20 bar can be used and the steam reforming reaction is still favored.

The hydrocarbons in the hydrocarbon feed can be converted to hydrogen in contact with the low temperature reforming catalyst. A hydrogen rich gas can be withdrawn from the reactor. The hydrogen rich gas can contain hydrogen, carbon monoxide, carbon dioxide, methane and combinations of the same. In at least one embodiment the hydrogen rich gas contains hydrogen. The hydrogen rich gas can contain between 45 mol % and 70 mol % hydrogen, alternately greater than 50 mol % hydrogen, and alternately greater than 60 wt % hydrogen.

The conversion of hydrocarbons to hydrogen rich gas can be greater than 50%, alternately greater than 60%, alternately greater than 70%, alternately greater than 80%, and alternately greater than 90%. The conversion of hydrocarbons to hydrogen can be greater than 50%, alternately greater than 60%, and alternately greater than 70% with the remaining gas in the hydrogen rich gas including carbon dioxide, carbon monoxide, and methane.

The low temperature reforming catalyst can be used in transportation applications or in applications requiring distributed or on-site production of hydrogen. The combination of the low temperature reforming catalyst in an on-site or on-board vehicle reformer and a fuel cell is called an auxiliary power unit (APU). The use of an auxiliary power unit can substantially lower the greenhouse gas emissions compared to diesel fuels. The APU can achieve efficiencies of 54% compared to 35% efficiency of diesel powered generators.

The low temperature reforming catalysts are in the absence of iron, cobalt, copper, platinum and other platinum group metals, such as rhodium and palladium, zirconium, ceria oxide, calcium, magnesium, and combinations of the same.

EXAMPLES

Example 1. Example 1 is a comparative example of lanthanide series metal-promoted nickel-based catalysts compared to the low temperature reforming catalysts described here.

The base nickel catalyst was prepared using an incipient wetness method. Alumina powder was dried at 250° C. for 1 hour. The alumina powder was obtained from Axens® (France). The dried alumina powder was then impregnated with nickel (II) hexahydrate $(Ni(NO_3)_2.6H_2O)$ to achieve 12 wt % nickel on the alumina powder. The nickel impregnated sample was dried at 60° C. and then subjected to ammonia vapors for 10 minutes in a covered glass trough inside the oven at 60° C. Following the ammonia treatment, drying of the nickel impregnated sample continued by increasing the temperature to 250° C. at a heating rate of 2° C./min. The dried sample was calcined at 450° C. for 2 hours and then cooled to room temperature in a desiccator to produce the base nickel catalyst $(Ni/Al_2O_3)$. FIG. 1 is a TEM micrograph image showing that the nickel particles of the base nickel catalyst are highly dispersed on the alumina support with particles of about 10 nm in size clearly visible.

The lanthanide series metal-promoted nickel-based catalysts were prepared using the wetness incipient impregnation method. In a first step, the dried alumina powder was impregnated with a lanthanide series solution. The lanthanide series metals used included lanthanum, cerium, samarium, europium, and gadolinium. The dried alumina powder was impregnated to achieve a precursor with 5 wt % of the lanthanide series metals. The precursors were dried at 250° C. for 8 hours. The dried precursors were then calcined in air with the temperature increased to 450° C. at a rate of 5° C./min to produce lanthanide promoted alumina. In a second step, the lanthanide promoted alumina was impregnated with nickel (II) hexahydrate $(Ni(NO_3)_2.6H_2O)$ to achieve a nickel impregnated lanthanide with 12 wt % nickel. The nickel impregnated lanthanide was then dried and calcined as described above to form the base nickel catalyst to produce the lanthanide series metal-promoted nickel-based catalysts.

Figure 2:
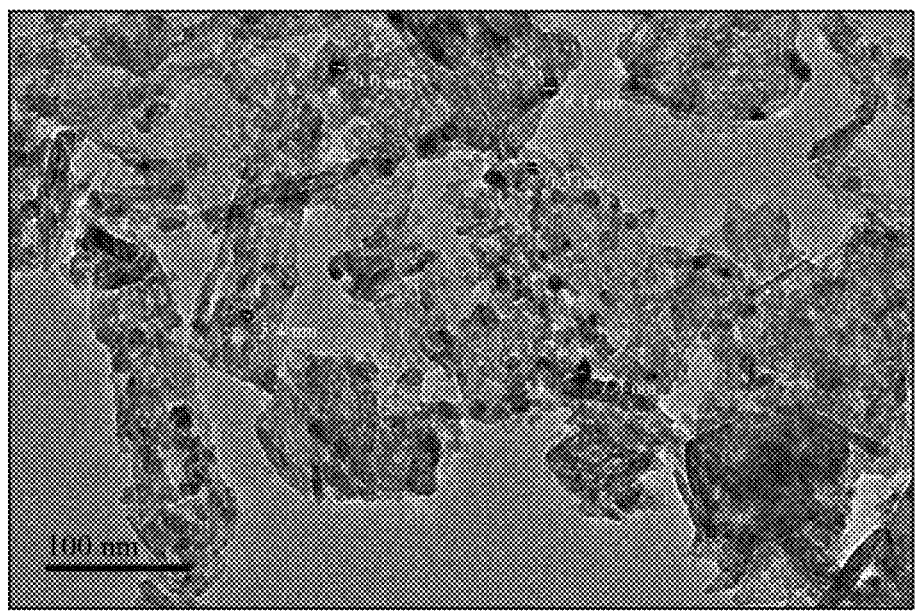
FIG. 2 provides a TEM image of a low temperature reforming catalyst.
Figure 3A:
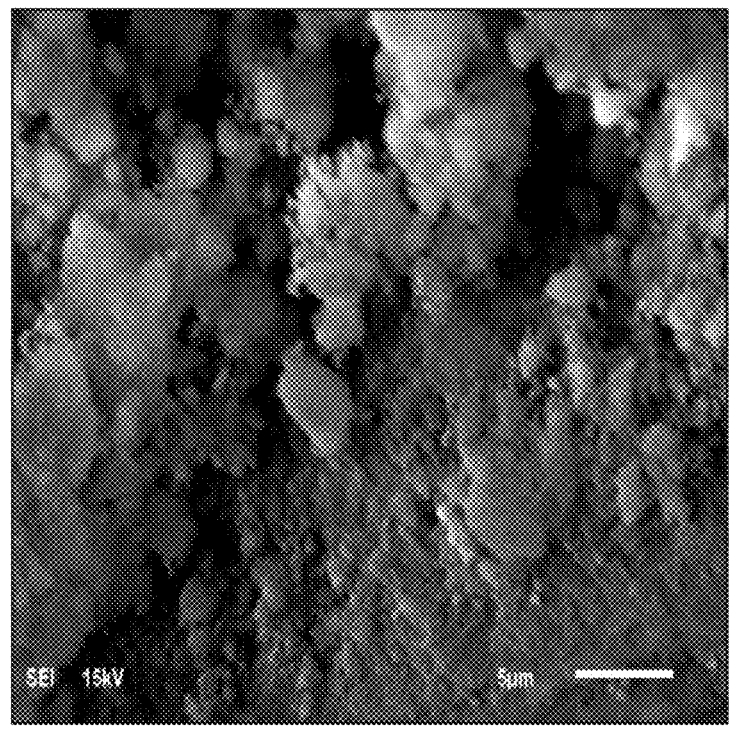
FIG. 3A-3D shows the results of an SEM/EDX analysis for an embodiment of the low temperature reforming catalyst of Example 1.
Figure 3B:
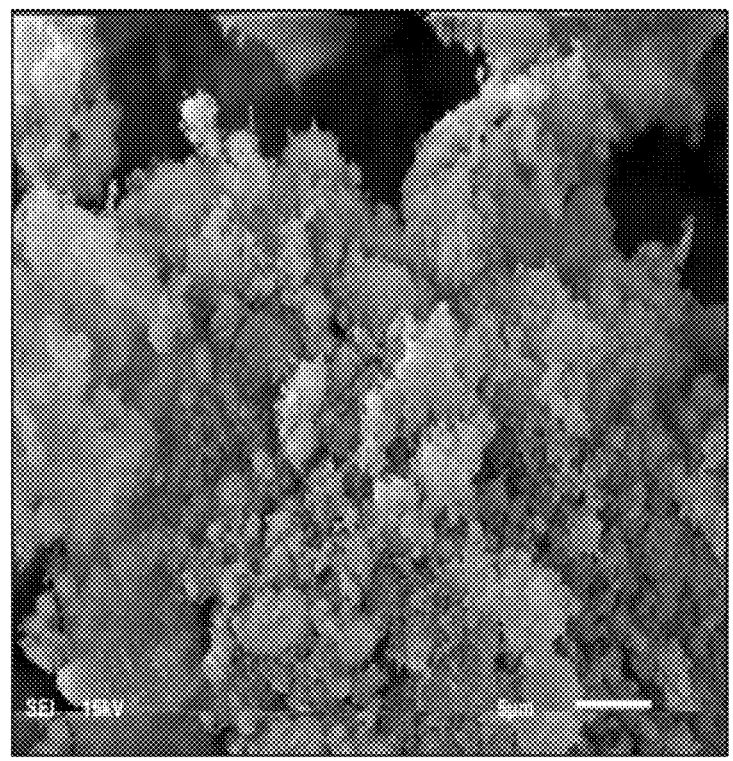
Figure 3C:
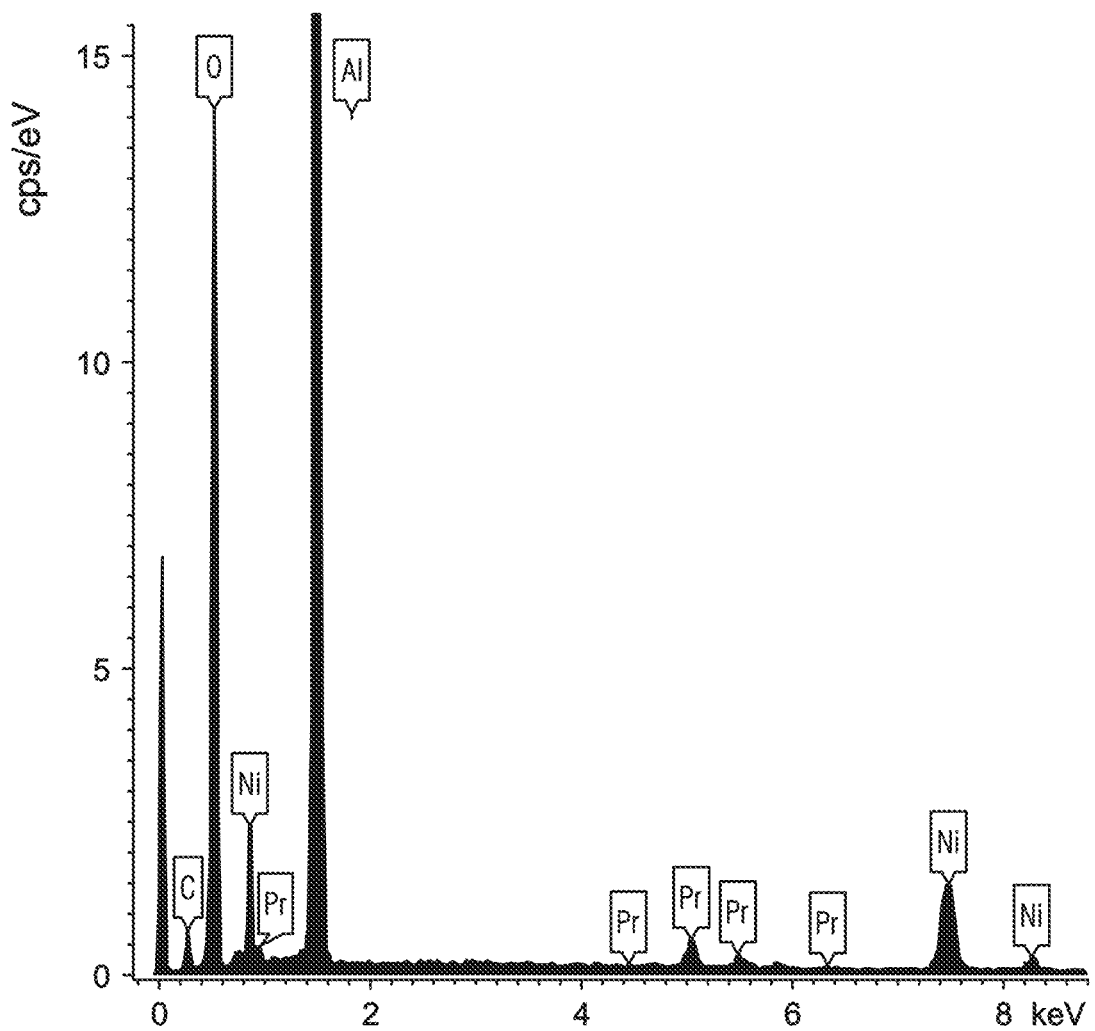
Figure 3D:
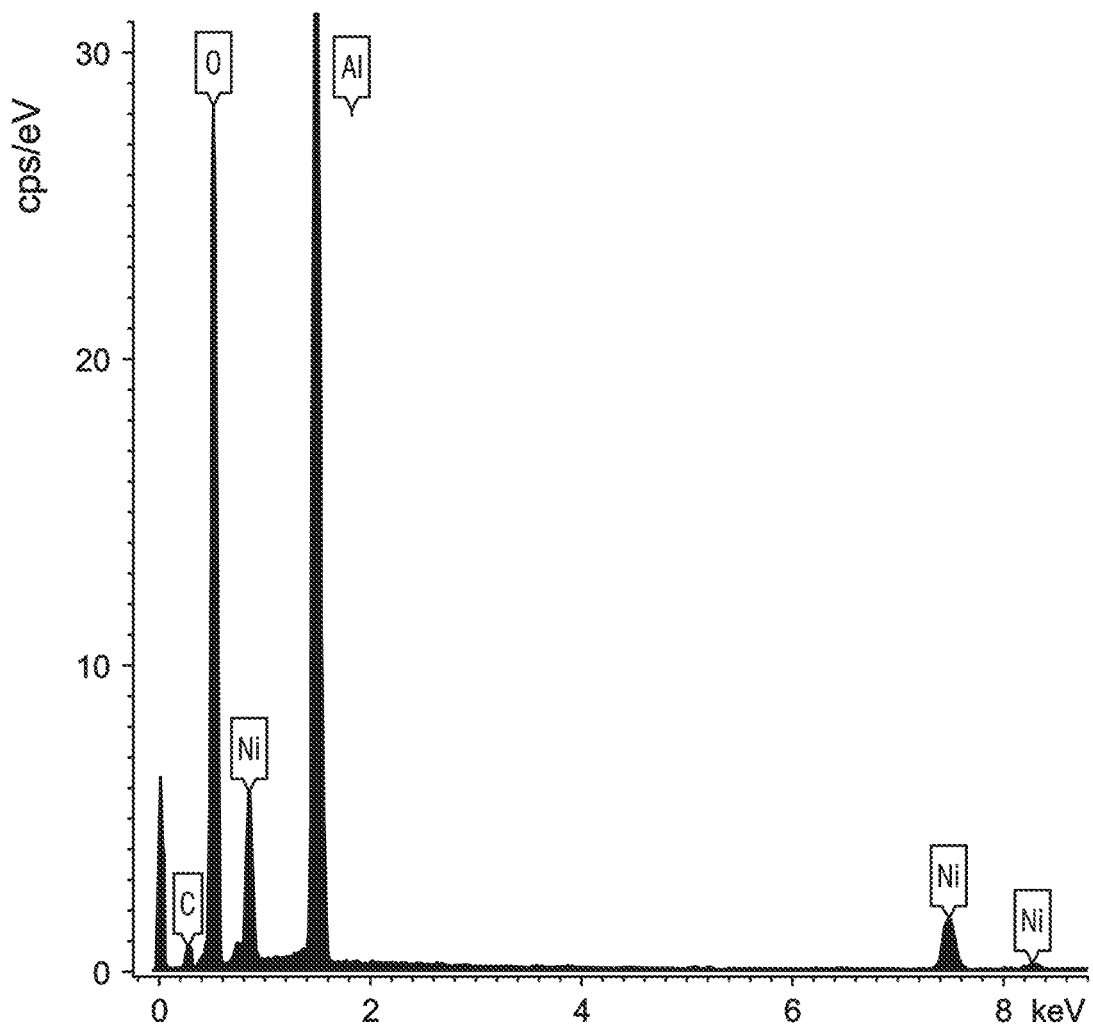

The low temperature reforming catalysts were prepared by the successive impregnation method described above to produce the lanthanide series metal-promoted nickel-based catalysts. The dried alumina powder was impregnated with praseodymium solution to produce low temperature reforming catalysts with 1 wt %, 3 wt %, 5 wt %, and 7 wt % praseodymium. The final weight of nickel was 12 wt %. FIG. 2 is a TEM micrograph image that shows the low temperature reforming catalyst with 5 wt % praseodymium (Pr—

Ni/Al$_2$O$_3$). The size of several of the particles are indicated in the TEM micrograph of FIG. 2.

FIG. 3A-3D shows the results of a SEM/EDX analysis for the 5 wt % Pr—Ni/Al$_2$O$_3$ low temperature reforming catalyst and the nickel base catalyst. EDX analysis provides a semi-quantitative composition of the samples. The results of the catalysts prepared in Example 1 are shown in Table 1.

TABLE 1

EDX and BET results of the catalysts of Example 1.

| Catalyst | Weight % | | | | | | BET Surface Area (m$^2$/g) |
|---|---|---|---|---|---|---|---|
| | Ni | La | Sm | Eu | Gd | Ce | Pr | |
| 12% Ni | 11.9 | | | | | | | 60.82 |
| 5%La-12%Ni | 11.9 | 4.9 | | | | | | 61.75 |
| 5%Sm-12%Ni | 12.1 | | 4.9 | | | | | 63.97 |
| 5%Eu-12%Ni | 12.1 | | | 5.0 | | | | 62.70 |
| 5%Gd-12%Ni | 12.5 | | | | 4.7 | | | 63.79 |
| 5%Ce-12%Ni | 12.2 | | | | | 4.9 | | 68.97 |
| 1%Pr-12%Ni | 12.0 | | | | | | 1.0 | Nd |
| 3%Pr-12%Ni | 12.0 | | | | | | 3.0 | Nd |
| 5%Pr-12%Ni | 12.0 | | | | | | 5.1 | 65.02 |
| 7%Pr-12%Ni | 12.0 | | | | | | 7.0 | Nd |

Figure 4:
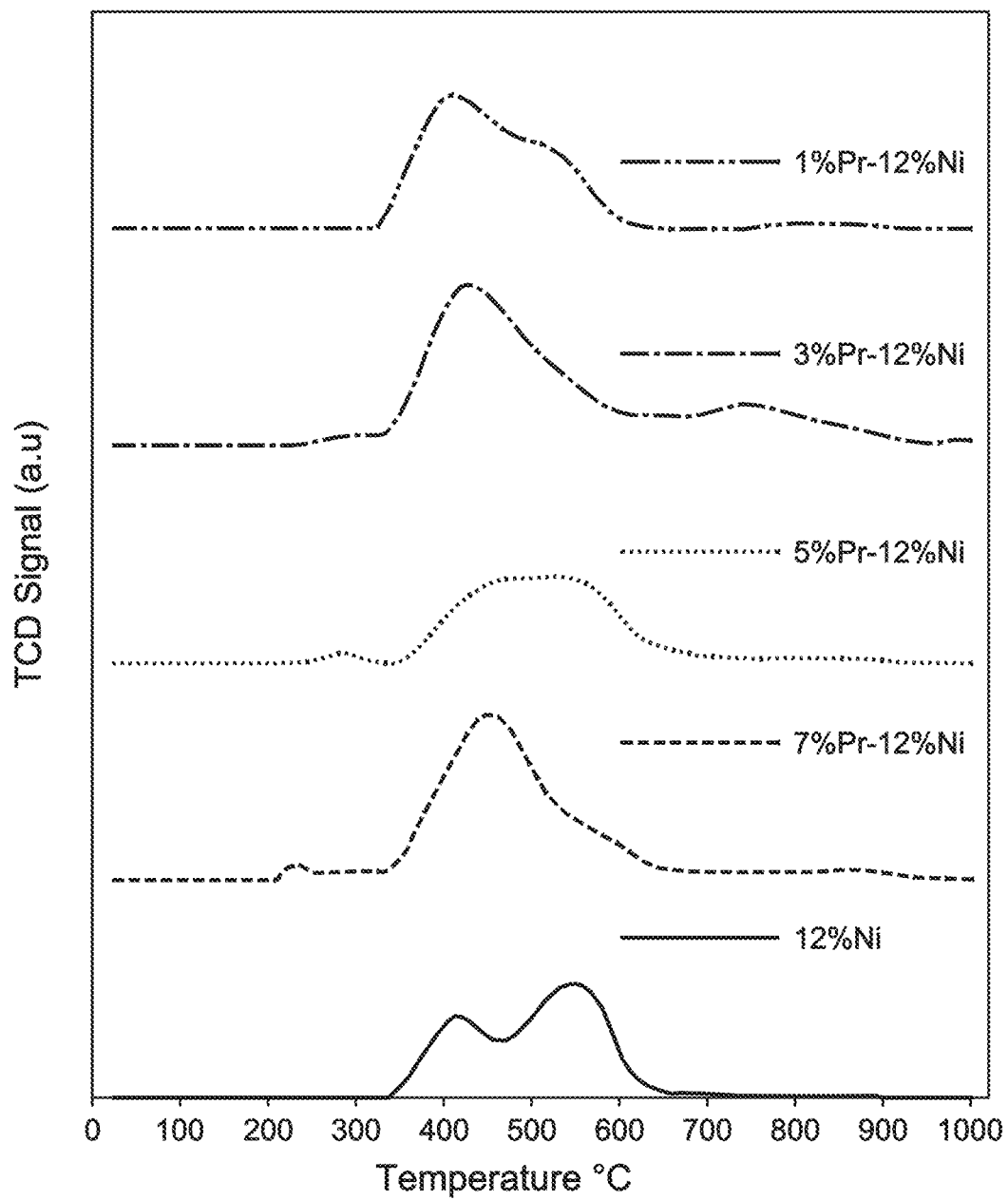
FIG. 4 provides the TPR profiles of the low temperature reforming catalysts.

The reduction properties of the low temperature reforming catalysts were determined using the hydrogen temperature programmed reduction (H2-TPR) method. In the H2-TPR method, measurements were performed in the presence of dilute hydrogen at a flow rate of 20 milliliters per minute (mL/min) and a heating rate of 10° C. up to 1000° C. using Micromeritics® A2720 system (Norcross, Ga.). FIG. 4 shows the TPR profiles of the low temperature reforming catalysts compared to the base nickel catalyst. The first peak (around 420° C.) and the second peak (around 550° C.) were ascribed to the reduction of strongly supported nickel species on alumina. The results indicate the influence of praseodymium modification in terms of the reduction properties of the base nickel catalyst. In the low temperature reforming catalysts the second peak has shifted toward the first peak and decreased in size, indicating the enhancement of low temperature reduction of nickel species reducing around 420° C.

Figure 5:
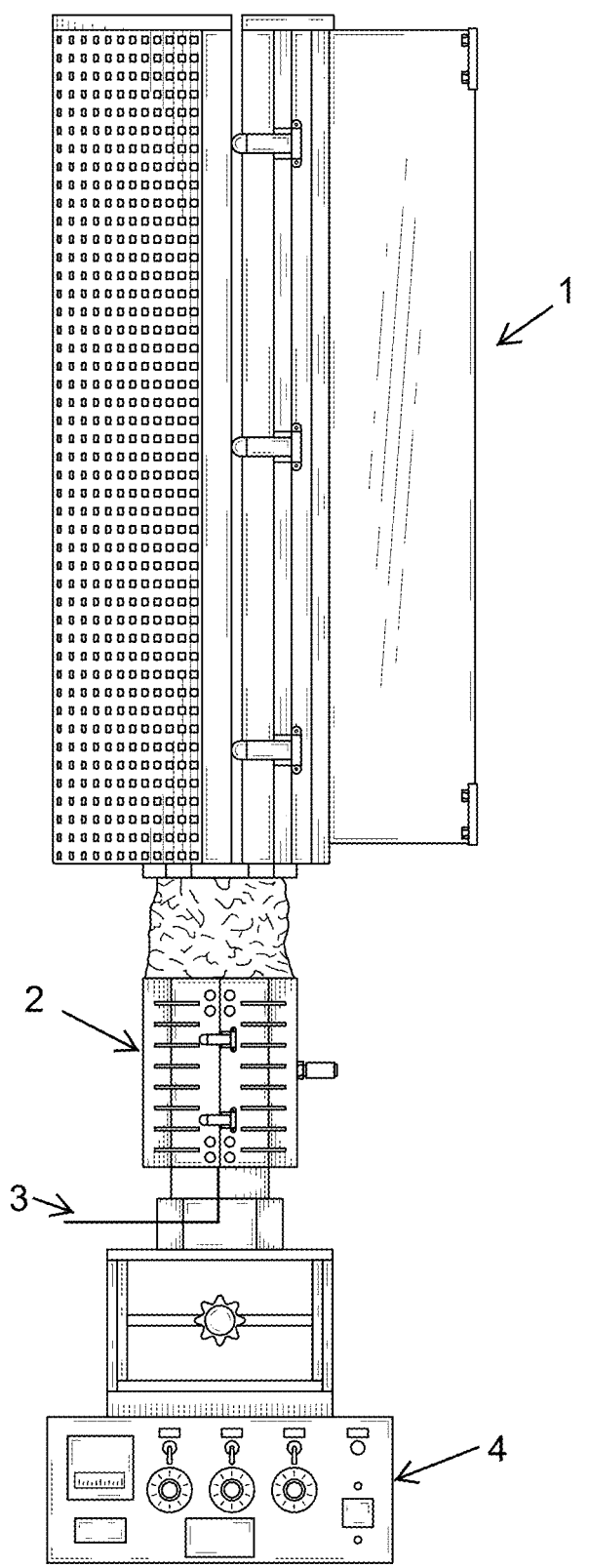
FIG. 5 shows a picture of the test unit for steam reforming reactions.

Example 2. Example 2 is a test of the performance of the low temperature reforming catalysts in producing hydrogen from methane in a steam reforming reaction. The test unit is described with reference to FIG. 5. A small cartridge type furnace (2), with a microprocessor-based temperature controller (4) and a thermocouple (3), was installed bellow an existing large furnace (1) of the micro-unit reaction system. The low temperature reforming catalysts of Example 1 were pelletized, crushed, and sieved to select particles having sizes between 0.2 and 0.5 mm for testing. A volume of the catalyst was packed into the reactor and placed in the small cartridge type furnace. The loaded catalyst was reduced in situ using 25% H$_2$ in N$_2$ overnight.

For the performance tests of the low temperature reforming catalysts, the system pressure was set at 3 bar, the gas hourly space velocity (GHSV) of the methane feed was about 18,000 h$^{-1}$, the catalyst loading was 5 cubic centimeters (cc), and the steam to carbon ratio was about 3.0. The performance of each catalyst was tested at steady state reaction temperatures of 500° C., 550° C., and 600° C.

Figure 6:
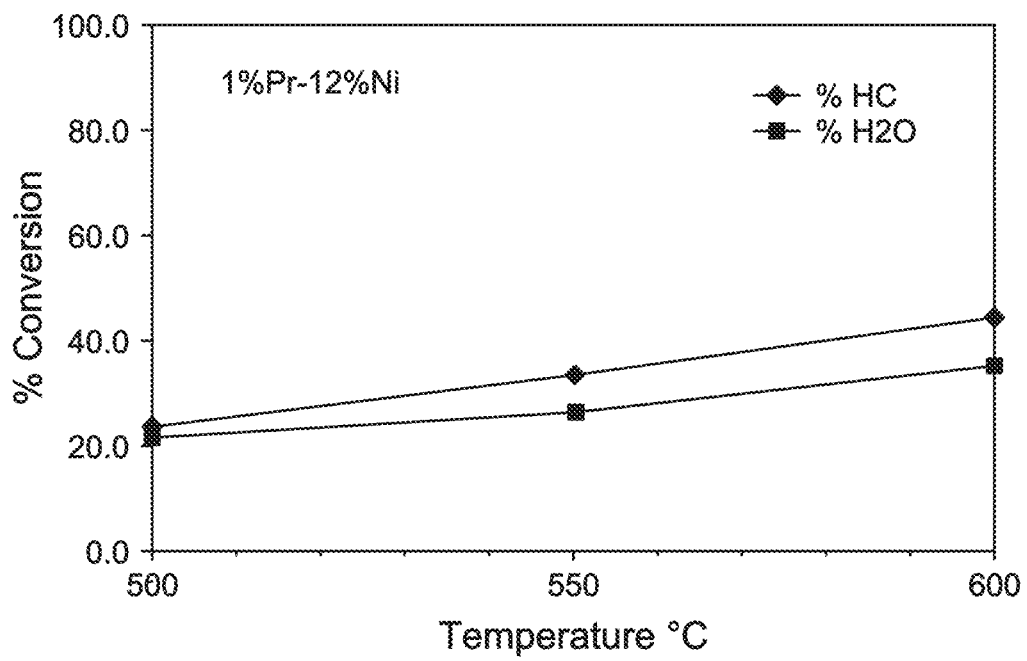
FIG. 6 shows the results of conversion of methane for an embodiment of the low temperature reforming catalyst of Example 2.

Table 2 shows the results using the 1% Pr-12% Ni/Al$_2$O$_3$ catalyst. FIG. 6 shows the results of methane and water conversion rates of the 1% Pr-12% Ni/Al$_2$O$_3$ catalyst at various temperatures. The results show 44.7% conversion of methane and 35.5% conversion of water at 600° C.

TABLE 2

Results of steam reforming of methane with 1% Pr-12% Ni/Al$_2$O$_3$

| | Run 1 | Run 2 | Run 3 |
|---|---|---|---|
| GHSV (h$^{-1}$) | 18066 | 17924 | 18082 |
| Run time (h) | 3.0 | 2.0 | 2.0 |
| Steam/carbon ratio | 3.1 | 3.1 | 3.1 |
| Temperature (° C.) | 500 | 550 | 600 |
| System Pressure (bar) | 3 | 3 | 3 |
| Mass balance (%) | 96.1 | 98.3 | 96.0 |
| Results | | | |
| Hydrocarbon conversion (%) | 23.8 | 33.6 | 44.7 |
| H$_2$O conversion (%) | 21.8 | 26.6 | 35.5 |
| Product Composition (L/h) | | | |
| H$_2$ | 21.9 | 30.1 | 39.3 |
| CO | 0.3 | 0.9 | 2.2 |
| CO$_2$ | 5.41 | 7.46 | 8.87 |
| CH$_4$ | 16.7 | 14.5 | 12.1 |
| Mole % | | | |
| H$_2$ | 49.5 | 56.9 | 62.9 |
| CO | 0.7 | 1.8 | 3.4 |
| CO$_2$ | 12.2 | 14.1 | 14.2 |
| CH$_4$ | 37.6 | 27.3 | 19.4 |

Figure 7:
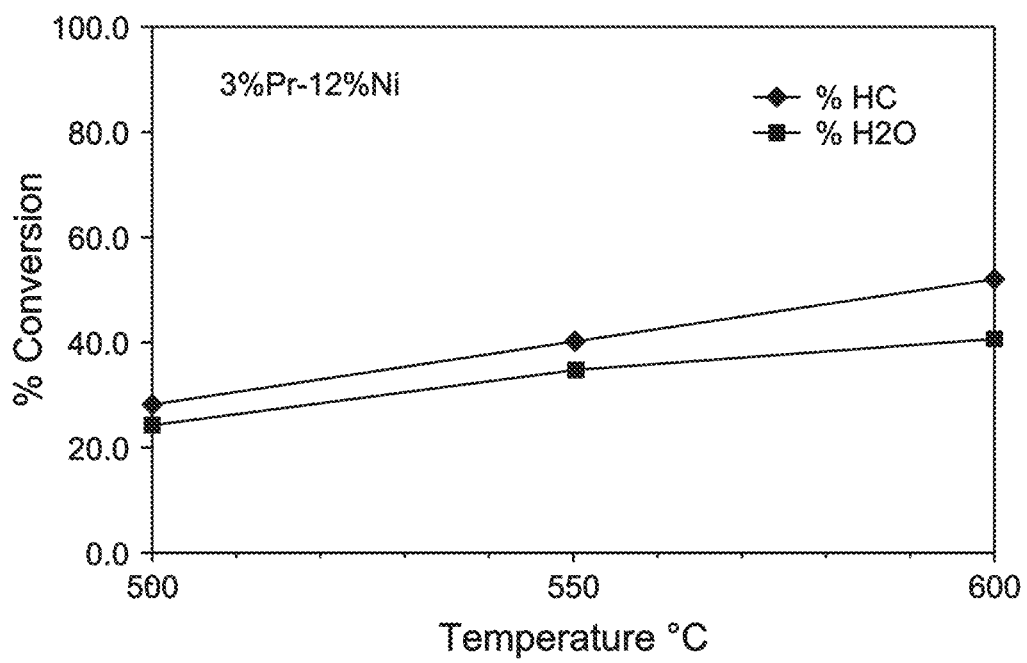
FIG. 7 shows the results of conversion of methane for an embodiment of the low temperature reforming catalyst of Example 2.

Table 3 shows the results using the 3% Pr-12% Ni/Al$_2$O$_3$ catalyst. FIG. 7 shows the results of methane and water conversion rates of the 3% Pr-12% Ni/Al$_2$O$_3$ catalyst. The results show 52.3% conversion of methane and 41.3% conversion of water at 600° C.

TABLE 3

Results of steam reforming of methane with 3% Pr-12% Ni/Al$_2$O$_3$

| | Run 1 | Run 2 | Run 3 |
|---|---|---|---|
| GHSV (h$^{-1}$) | 18020 | 17797 | 17937 |
| Run time (h) | 2.1 | 2.1 | 2.0 |
| Steam/carbon ratio | 3.1 | 3.1 | 3.1 |
| Temperature (° C.) | 500 | 550 | 600 |
| System Pressure (bar) | 3 | 3 | 3 |
| Mass balance (%) | 96.0 | 92.9 | 94.5 |
| Results | | | |
| Hydrocarbon conversion (%) | 28.4 | 40.0 | 52.3 |
| H$_2$O conversion (%) | 24.3 | 34.8 | 41.3 |
| Product Composition (L/h) | | | |
| H$_2$ | 24.9 | 33.0 | 44.3 |
| CO | 0.5 | 1.3 | 3.2 |
| CO$_2$ | 6.19 | 7.89 | 9.56 |
| CH$_4$ | 15.7 | 13.0 | 10.4 |
| Mole % | | | |
| H$_2$ | 52.7 | 59.8 | 65.6 |
| CO | 1.0 | 2.3 | 4.8 |
| CO$_2$ | 13.1 | 14.3 | 14.2 |
| CH$_4$ | 33.2 | 23.6 | 15.5 |

Figure 8:
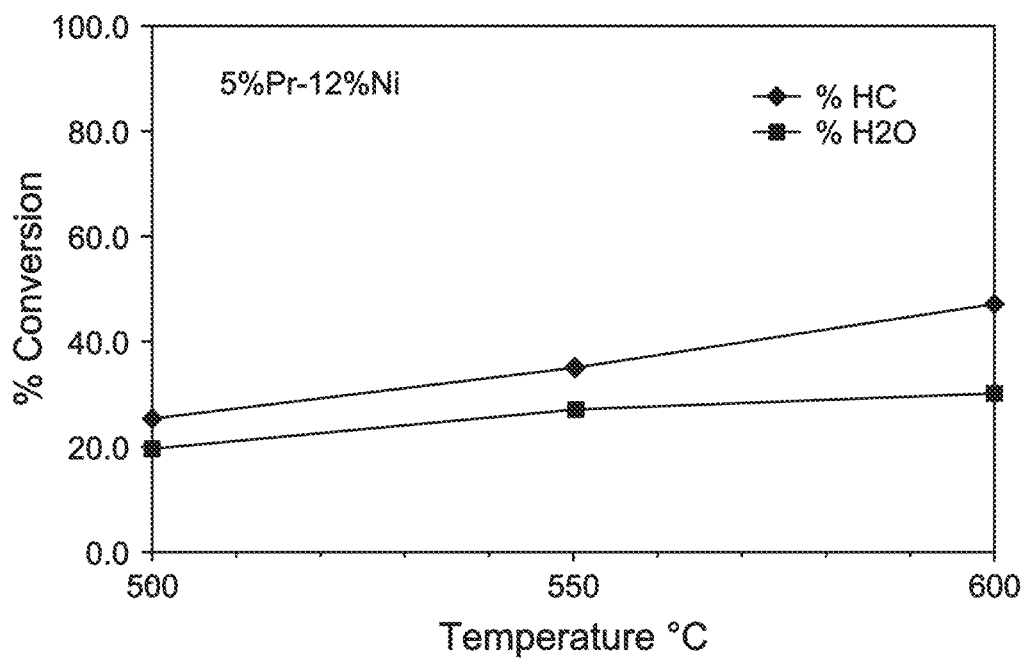
FIG. 8 shows the results of conversion of methane for an embodiment of the low temperature reforming catalyst of Example 2.

Table 4 shows the results using the 5% Pr-12% Ni/Al$_2$O$_3$ catalyst. FIG. 8 shows the results of methane and water conversion using the 5% Pr-12% Ni/Al$_2$O$_3$ catalyst at various temperatures. The results show 47.0% conversion of methane and 30.3% conversion of water at 600° C.

TABLE 4

Results of steam reforming of methane with 5% Pr-12% Ni/Al$_2$O$_3$

|  | Run 1 | Run 2 | Run 3 | Run 4 |
|---|---|---|---|---|
| GHSV (h$^{-1}$) | 17914 | 17920 | 17920 | 18802 |
| Run time (h) | 5.0 | 5.2 | 5.0 | 5.0 |
| Steam/carbon ratio | 3.1 | 3.1 | 3.1 | 3.1 |
| Temperature (° C.) | 500 | 550 | 600 | 500 |
| System Pressure (bar) | 3.0 | 3.0 | 3.0 | 3.0 |
| Mass balance (%) | 100.9 | 100.0 | 102.0 | 96.9 |
| Results | | | | |
| Hydrocarbon conversion (%) | 25.5 | 34.9 | 47.0 | 23.6 |
| H$_2$O conversion (%) | 19.6 | 27.1 | 30.3 | 23.1 |
| Product Composition (L/h) | | | | |
| H$_2$ | 25.2 | 33.5 | 42.0 | 24.8 |
| CO | 0.4 | 1.2 | 2.5 | 0.4 |
| CO$_2$ | 6.3 | 8.0 | 9.3 | 6.1 |
| CH$_4$ | 16.2 | 14.2 | 11.5 | 17.4 |
| Mole % | | | | |
| H$_2$ | 52.3 | 58.9 | 64.3 | 50.9 |
| CO | 0.9 | 2.1 | 3.9 | 0.8 |
| CO$_2$ | 13.1 | 14.1 | 14.2 | 12.6 |
| CH$_4$ | 33.6 | 24.9 | 17.6 | 35.8 |

Figure 9:
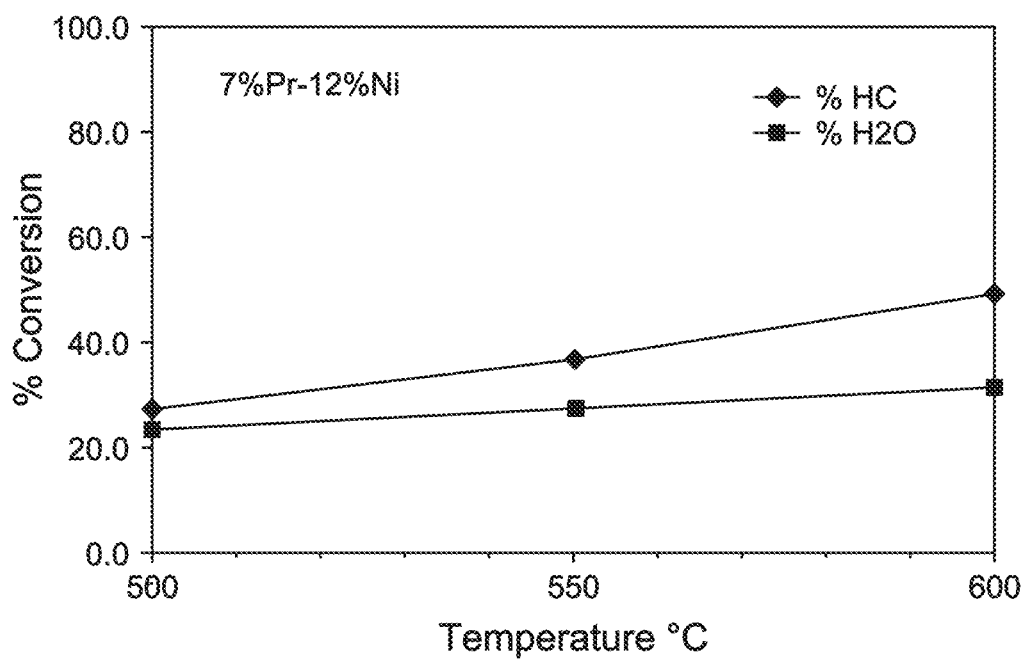
FIG. 9 shows the results of conversion of methane for an embodiment of the low temperature reforming catalyst of Example 2.

Table 5 shows the results using the 7% Pr-12% Ni/Al$_2$O$_3$ catalyst. FIG. 9 shows the results of methane and water conversion using the 7% Pr-12% Ni/Al$_2$O$_3$ catalyst at various temperatures. The results show 49.3% conversion of methane and 31.7% conversion of water at 600° C.

TABLE 5

Results of steam reforming of methane with 7% Pr-12% Ni/Al$_2$O$_3$

|  | Run 1 | Run 2 | Run 3 |
|---|---|---|---|
| GHSV (h$^{-1}$) | 18075 | 17994 | 18081 |
| Run time (h) | 4.0 | 5.0 | 4.4 |
| Steam/carbon ratio | 3.2 | 3.1 | 3.1 |
| Temperature (° C.) | 500 | 550 | 600 |
| System Pressure (bar) | 3 | 3 | 3 |
| Mass balance (%) | 96.9 | 99.3 | 100.8 |
| Results | | | |
| Hydrocarbon conversion (%) | 27.5 | 36.8 | 49.2 |
| H$_2$O conversion (%) | 23.6 | 27.6 | 31.7 |
| Product Composition (L/h) | | | |
| H$_2$ | 25.3 | 33.6 | 42.9 |
| CO | 0.5 | 1.2 | 2.8 |
| CO$_2$ | 6.22 | 8.06 | 9.35 |
| CH$_4$ | 15.8 | 13.8 | 11.1 |
| Mole % | | | |
| H$_2$ | 52.9 | 59.3 | 64.9 |
| CO | 1.0 | 2.1 | 4.2 |
| CO$_2$ | 13.0 | 14.2 | 14.1 |
| CH$_4$ | 33.1 | 24.3 | 16.8 |

Figure 10:
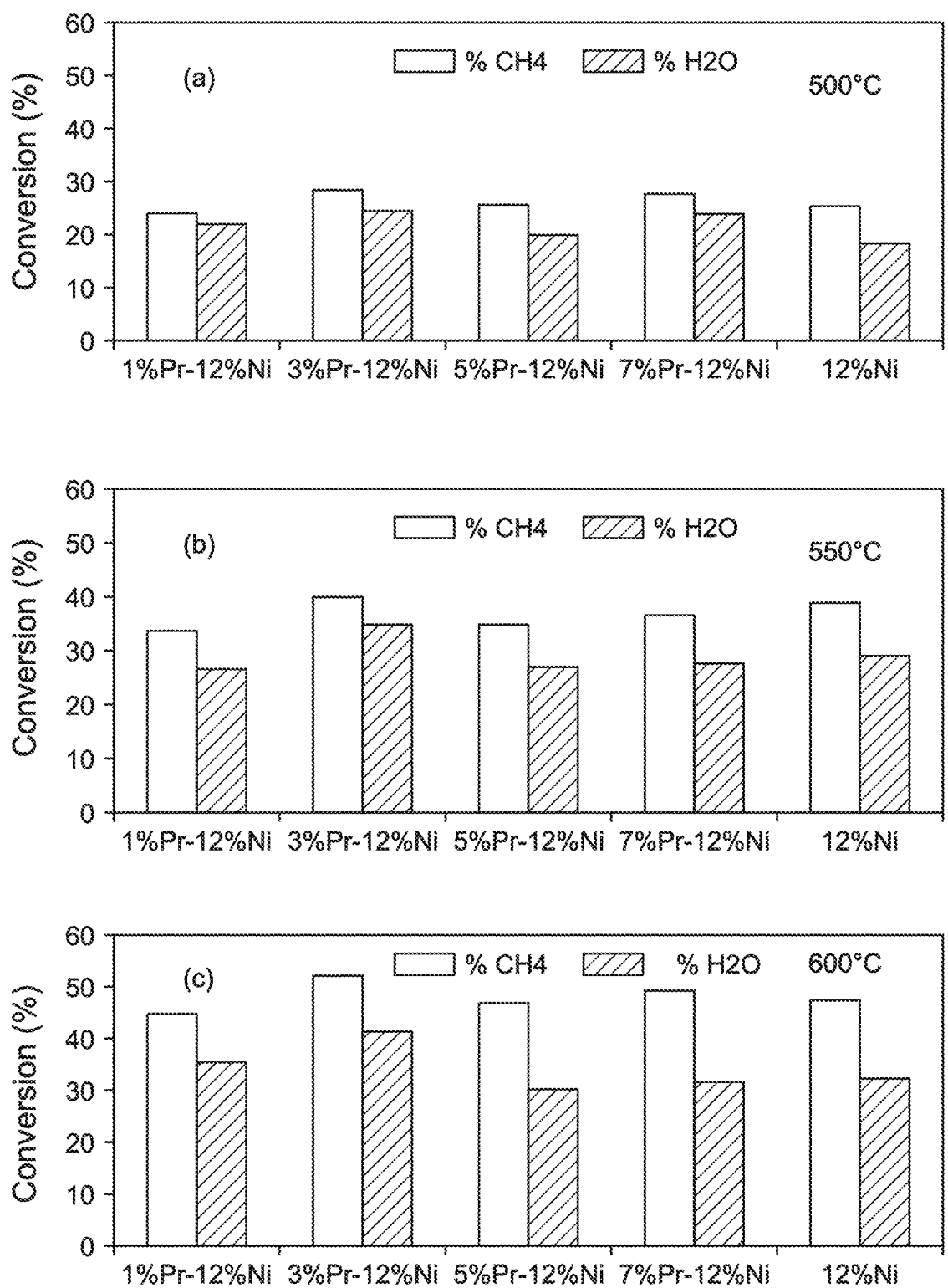
FIG. 10 shows a comparison of conversion of methane for embodiments of the low temperature reforming catalyst of Example 2.

FIG. 10 shows the conversion results for each of the low temperature reforming catalysts for each of the temperatures compared to the base nickel catalyst of Example 1. An increase in methane conversion and water conversion in the 3% Pr-12% Ni/Al$_2$O$_3$ compared to the base nickel catalysts is observed.

Figure 11:
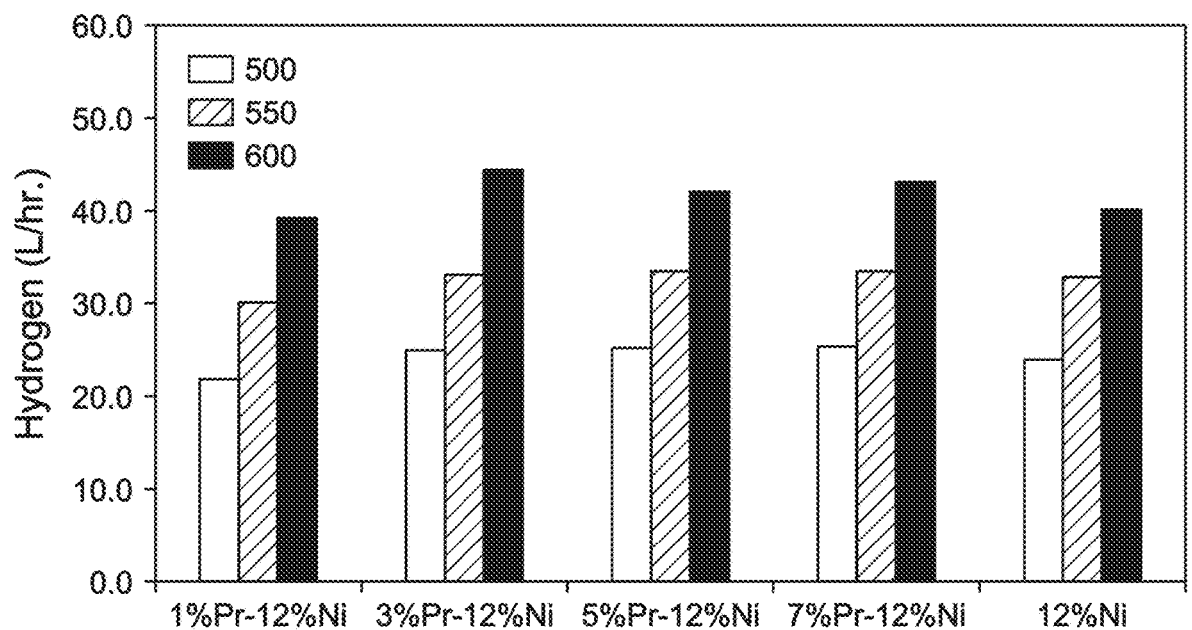
FIG. 11 shows a comparison of the results of hydrogen production for embodiments of the low temperature reforming catalyst of Example 2.

FIG. 11 summarizes the performance of the low temperature reforming catalysts in hydrogen yield for each of the temperatures of the test runs. The results show that the 3% Pr-12% Ni/Al$_2$O$_3$ produced a greater amount of hydrogen (in liters per hour) compared to the other low temperature reforming catalysts and the base nickel catalyst.

Figure 12:
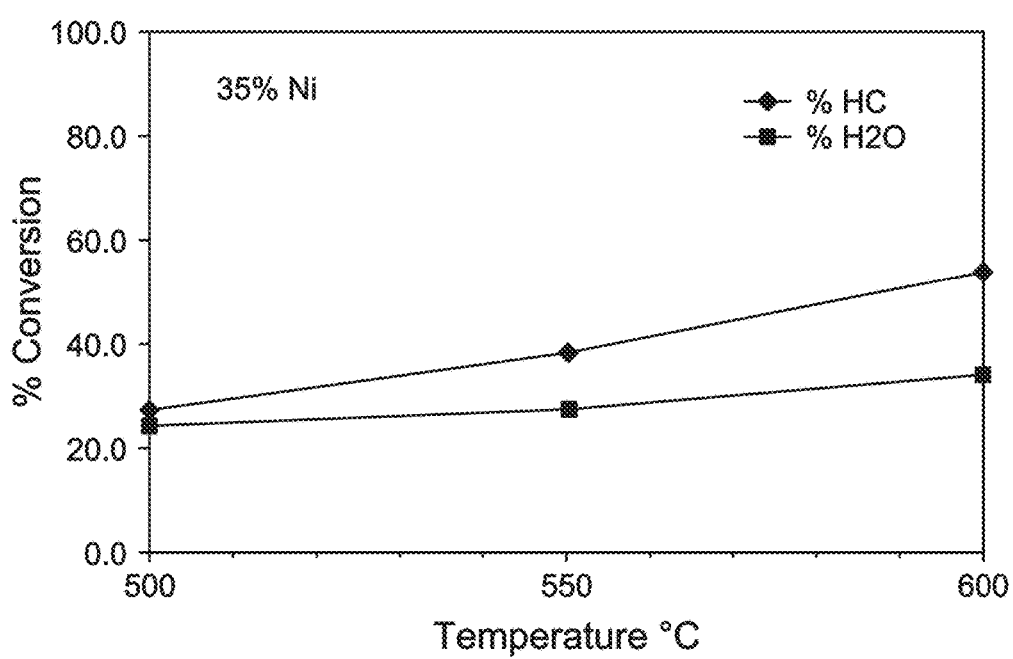
FIG. 12 shows the results of conversion of methane for a base nickel catalyst.

Table 6 shows the results using a base nickel catalyst with 35% nickel (35% Ni/Al$_2$O$_3$ catalyst). FIG. 12 shows the results of methane and water conversion using the 35% Ni/Al$_2$O$_3$ catalyst at various temperatures. The results show 54.0% conversion of methane and 34.3% conversion of water at 600° C.

TABLE 6

Results of steam reforming of methane with 35% Ni/Al$_2$O$_3$

|  | Run 1 | Run 2 | Run 3 | Run 4 |
|---|---|---|---|---|
| GHSV (h$^{-1}$) | 17986 | 17807 | 18024 | 18000 |
| Run time (h) | 5.0 | 5.0 | 5.1 | 5.0 |
| Steam/carbon ratio | 3.1 | 3.1 | 3.1 | 3.1 |
| Temperature (° C.) | 500 | 550 | 600 | 500 |
| System Pressure (bar) | 3 | 3 | 3 | 3 |
| Mass balance (%) | 99.2 | 102.9 | 102.8 | 98.2 |
| Results | | | | |
| Hydrocarbon conversion (%) | 27.5 | 38.7 | 54.0 | 28.0 |
| H$_2$O conversion (%) | 24.6 | 27.6 | 34.3 | 24.8 |
| Product Composition (L/h) | | | | |
| H$_2$ | 28.7 | 37.9 | 48.8 | 27.9 |
| CO | 0.5 | 1.5 | 3.6 | 0.5 |
| CO$_2$ | 7.11 | 9.04 | 10.36 | 6.87 |
| CH$_4$ | 15.9 | 13.4 | 10.0 | 15.7 |
| Mole % | | | | |
| H$_2$ | 55.0 | 61.3 | 67.1 | 54.7 |
| CO | 1.0 | 2.4 | 4.9 | 1.1 |
| CO$_2$ | 13.6 | 14.6 | 14.2 | 13.5 |
| CH$_4$ | 30.4 | 21.7 | 13.8 | 30.8 |

Example 3. In Example 3 hydrocarbon conversion of a naphtha pre-reformer effluent was studied with the 3% Pr-12% Ni/Al$_2$O$_3$ at various temperatures and at various pressures. The same unit described in Example 2 was utilized. The feed to the test unit had the properties shown in Table 7.

TABLE 7

Test unit feed composition

| Property | Trial Runs 1-16 | Trial Runs 17-26 |
|---|---|---|
| CH$_4$ flow (ml/min) | 49.3 | 46.86 |
| CO$_2$ flow (ml/min) | 31.8 | 0.00 |
| N$_2$ flow (ml/min) | 44.9 | 28.06 |
| H$_2$O flow (ml/min) | 0.2 | 0.12 |
| H$_2$ flow (ml/min) | 53.9 | 0.0 |
| CO flow (ml/min) | 0 | 0.0 |
| Steam/carbon ratio | 2.7 | 3.5 |
| GHSV (h$^{-1}$) | 8,051.5 | 4776.37 |

For trial runs 1-16, the temperature was held constant at 550° C. and pressures of 5 bar, 20 bar, and 30 bar were tested. Table 8 shows the results of the catalyst for trial runs 1-16. The results show good activity and positive conversion under the operating conditions up to 30 bar. At higher pressures, the methanation reaction (CO$_2$+H$_2$) is favored as seen in the results.

TABLE 8

Results of steam reforming of feed with 3% Pr-12% Ni/Al$_2$O$_3$ at 550° C.

| Absolute Pressure | Trial No. | Composition (mol %) (N$_2$ and H$_2$O free) | | | | Hydrocarbon Conversion (%) | Average Hydrocarbon Conversion (%) |
|---|---|---|---|---|---|---|---|
| | | H$_2$ | CO$_2$ | CO | CH$_4$ | | |
| 5 bar | 1 | 56.13 | 22.06 | 2.39 | 19.42 | 32.94 | 32.99 |
| | 2 | 56.05 | 22.12 | 2.39 | 19.44 | 33.94 | |
| | 3 | 55.54 | 22.17 | 2.39 | 19.90 | 32.13 | |
| | 4 | 56.17 | 22.09 | 2.38 | 19.36 | 32.90 | |
| | 5 | 56.11 | 22.19 | 2.38 | 19.33 | 33.07 | |
| 20 bar | 6 | 44.35 | 20.76 | 1.37 | 33.52 | 5.20 | 3.61 |
| | 7 | 39.56 | 20.48 | 2.29 | 37.66 | 2.06 | |
| | 8 | 43.24 | 20.83 | 2.12 | 33.81 | 5.47 | |
| | 9 | 42.03 | 21.07 | 2.28 | 34.62 | 4.94 | |
| | 10 | 42.35 | 20.95 | 1.37 | 35.32 | 0.36 | |
| 30 bar | 11 | 34.86 | 22.03 | 1.29 | 41.82 | −5.52 | −9.11 |
| | 12 | 38.98 | 20.66 | 1.51 | 38.85 | −8.52 | |
| | 13 | 38.22 | 21.12 | 1.18 | 39.49 | −11.15 | |
| | 14 | 38.62 | 20.63 | 1.88 | 38.87 | −8.01 | |
| | 15 | 39.10 | 20.84 | 1.17 | 38.89 | −10.28 | |
| | 16 | 38.61 | 20.89 | 1.19 | 39.31 | −11.22 | |

For trial runs 17-26, the pressure was held constant at 5 bar and temperatures of 550° C. and 600° C. were tested. Table 9 shows the results of the 3% Pr-12% Ni/Al$_2$O$_3$ catalyst for trial runs 17-26. The results show good activity. The production compositions and conversions are close to the thermodynamic conversion and product composition under operating conditions.

TABLE 9

Results of steam reforming of feed with 3% Pr-12% Ni/Al$_2$O$_3$ at 5 bar.

| Absolute Pressure | Trial No. | Composition (mol %) (N$_2$ and H$_2$O free) | | | | Hydrocarbon Conversion (%) |
|---|---|---|---|---|---|---|
| | | H$_2$ | CO$_2$ | CO | CH$_4$ | |
| 550° C. | 17 | 61.57 | 14.86 | 1.95 | 21.63 | 43.56 |
| | 18 | 61.44 | 14.61 | 2.88 | 21.07 | 46.72 |
| | 19 | 61.82 | 14.74 | 1.82 | 21.62 | 43.18 |
| | 20 | 61.64 | 14.57 | 2.35 | 21.44 | 45.07 |
| | 21 | 61.66 | 14.68 | 2.44 | 21.22 | 45.68 |
| 600° C. | 22 | 65.26 | 15.40 | 2.82 | 16.52 | 52.88 |
| | 23 | 64.76 | 14.82 | 2.66 | 16.77 | 50.11 |
| | 24 | 65.30 | 14.54 | 3.78 | 16.38 | 53.70 |
| | 25 | 64.82 | 15.46 | 3.23 | 16.49 | 54.88 |
| | 26 | 64.98 | 15.60 | 2.78 | 16.63 | 53.20 |

Although the embodiments here have been described in detail, it should be understood that various changes, substitutions, and alterations can be made hereupon without departing from the principle and scope of the embodiments. Accordingly, the scope should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the embodiments pertain, except when these references contradict the statements made here.

As used here and in the appended claims, the words "comprise," "has," and "include" and all grammatical variations of the same are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present embodiments.

That which is claimed is:

1. A method for producing a hydrogen rich gas from a hydrocarbon feed, the method comprising the steps of:
   preparing a low temperature reforming catalyst comprising the steps of:
   impregnating a dried alumina powder with a praseodymium nitrate solution to produce a precursor containing the amount of praseodymium;
   drying the precursor at 250° C. for 8 hours to produce a dried precursor;
   increasing a temperature of the dried precursor to 450° C. at a rate of 5° C./min;
   calcining the dried precursor in air at 450° C. for at least 4 hours to produce a calcined precursor;
   reducing a temperature of the calcined precursor;
   impregnating the calcined precursor with Ni(NO$_3$)$_3$.6H$_2$0 solution to produce a nickel impregnated precursor;

drying the nickel impregnated precursor at a temperature of 60° C. for at least 1 hour;
subjecting the nickel impregnated precursor to ammonia vapors for 10 minutes;
increasing a temperature of the nickel impregnated precursor to 250° C. at a rate of 2° C./min;
drying the nickel impregnated precursor at 250° C. for at least 1 hour to produce a dried catalyst;
calcining the dried catalyst in air at 450° C. for about 2 hours to produce a calcined catalyst; and
reducing a temperature of the calcined catalyst to room temperature in a desiccator to produce the low temperature reforming catalyst, where the dessicator is configured to desiccate the calcined catalyst to produce particles of the low temperature reforming catalyst;

introducing the hydrocarbon feed to a reactor, the reactor comprising the low temperature reforming catalyst, the low temperature reforming catalyst comprising:
an amount of praseodymium,
12 wt % nickel, and
an aluminum oxide component;

introducing a steam feed to the reactor, wherein the steam feed comprises steam, wherein a ratio of steam to carbon is in the range between 2.8 and 4.2;

contacting the low temperature reforming catalyst with the hydrocarbon feed in the reactor, wherein the reactor operates at a temperature between 500° C. and 600° C., wherein the reactor operates at a pressure between 3 bar and 40 bar; and producing the hydrogen rich gas over the low temperature reforming catalyst, wherein the hydrogen rich gas comprises hydrogen.

2. The method of claim 1, wherein the amount of praseodymium is present in an amount between 1 wt % and 9 wt %.

3. The method of claim 1, wherein the amount of praseodymium is 3 wt %.

4. The method of claim 1, wherein the hydrocarbon feed comprises methane.

5. The method of claim 1, wherein the hydrogen rich gas comprises an additional gas selected from the group consisting of carbon dioxide, carbon monoxide, methane, nitrogen, and combinations of the same.

6. The method of claim 1, further comprising reducing the low temperature reforming catalyst before contacting the low temperature reforming catalyst with the hydrocarbon feed, comprising the step of:
introducing a reducing gas to the reactor for at least 8 hours, wherein the reducing gas comprises hydrogen and nitrogen.

7. The method of claim 1, further comprising the step of sieving the particles of the low temperature reforming catalyst to obtain particles in the range between 0.1 mm and 1 mm.

8. The method of claim 1, wherein a conversion of the hydrocarbon feed to hydrogen is greater than 50%.

9. The method of claim 1, wherein the hydrogen rich gas is a fuel for a vehicle.

10. The method of claim 1, wherein an amount of hydrogen in the hydrogen rich gas is in the range between 45 mol % and 75 mol %.

11. The method of claim 1, wherein the reactor is an impregnated membrane reactor, wherein the impregnated membrane reactor comprises a hydrogen selective membrane impregnated with the low temperature reforming catalyst.

* * * * *